United States Patent
Goddard et al.

(10) Patent No.: US 6,318,492 B1
(45) Date of Patent: Nov. 20, 2001

(54) INTEGRAL KNUCKLE AND HUB LOCK

(75) Inventors: Steven G. Goddard; James A. Krisher, both of Fort Wayne, IN (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/222,124

(22) Filed: Dec. 29, 1998

(51) Int. Cl.$^7$ .................................... B60K 17/354
(52) U.S. Cl. ......................... 180/247; 192/69.41
(58) Field of Search .................. 180/245, 247, 180/248, 249, 250; 192/253, 258, 269, 69.4, 69.41, 69.42, 69.43

(56) References Cited

U.S. PATENT DOCUMENTS

| | | |
|---|---|---|
| 4,627,512 | 12/1986 | Clohessy . |
| 4,632,207 * | 12/1986 | Moore .................... 180/247 |
| 4,817,752 | 4/1989 | Lobo . |
| 4,960,192 | 10/1990 | Kurihara . |
| 5,085,304 * | 2/1992 | Barroso ................ 192/69.41 |
| 5,123,513 | 6/1992 | Petrak . |
| 5,141,088 | 8/1992 | Kurihara . |
| 5,148,901 * | 9/1992 | Kurihara et al. ......... 192/69.41 |
| 5,219,054 * | 6/1993 | Teraoka ................. 192/69.41 |
| 5,353,890 | 10/1994 | Clohessy . |
| 5,740,895 | 4/1998 | Bigley . |
| 5,984,422 * | 11/1999 | Seifert ................... 301/105.1 |
| 6,109,411 * | 8/2000 | Bigley ................... 192/69.41 |
| 6,234,289 * | 5/2001 | Baker et al. ............ 192/69.41 |

\* cited by examiner

Primary Examiner—Robert P. Olszewski
Assistant Examiner—Andrew J. Fischer
(74) Attorney, Agent, or Firm—Scott M. Oldham; Hahn, Loeser + Parks, LLP

(57) ABSTRACT

An improved wheel end assembly integrates into the steering knuckle a feature for providing driving engagement/disengagement of a wheel to convert between driven and non-driven modes of wheel movement. Such a wheel end assembly receives drive torque from a half shaft through a constant velocity ("CV") joint. The wheel end assembly has the steering knuckle, which is coupled to the vehicle and which integrally houses a hub lock actuator assembly. A bearing assembly mounted to the knuckle allows for free rotation of a cylindrical wheel hub mounted thereon about a central axis of the hub. The wheel hub has a flange for mounting the wheel at an outboard end thereof and a drive flange at an inboard end thereof, an outer circumference of the flange having a plurality of external teeth spaced evenly therearound. A stub shaft has an outboard end thereof rotatingly supported in the wheel hub and an inboard end thereof defining a housing for the CV joint, the housing having a plurality of external teeth identical in size and number to the teeth on the drive flange. The housing and the flange are axially adjacent to each other. A clutch member with internal teeth sized and adapted for engaging the external teeth on the housing and the drive flange is slidable axially between a first position in which the clutch member teeth engage only the CV housing teeth and no drive torque is transferred from the half shaft to the wheel hub and a second position in which the clutch teeth engage both the CV housing teeth and the drive flange teeth and drive torque is transferred from the half shaft to the wheel hub through the engagement. The hub lock actuator assembly moves the clutch member selectively between the first and second positions.

18 Claims, 2 Drawing Sheets

INTEGRAL KNUCKLE AND HUB LOCK

The present invention relates to a knuckle and hub lock for a vehicle axle, particularly a knuckle and hub lock actuator assembly which are formed in an integral fashion. The hub lock actuator assembly actuates a clutch shiftable between positions for connecting and disconnecting drive and driven components of the vehicle to render selected wheels passive or power-driven. The invention finds application in axle assemblies which selectively receive drive torque.

BACKGROUND OF THE INVENTION

Some four-wheel vehicles are capable of being selectively switched from a condition of two-wheel drive (often referred to as "4×2") to a condition of four-wheel drive (often referred to as "4×4"). Such a vehicle requires that one of the axles comprise a set of half shafts in which a hub is locked to the half shaft and receiving drive torque part of the time, but the hub may be rotationally disengaged from the half shaft at other times, during which the hubs are able to freewheel. This is desirable as it prevents forced rotation of the drive train as a result of the front wheels being driven as the vehicle is propelled.

In a vehicle having two axles with four wheels, only one of the axles will be provided with steerable wheels. This axle is usually the axle which receives drive torque on a selective basis, the non-steerable axle normally being provided with full-time drive torque. While the technical requirements for a non-steerable, full-time-drive axle are among the least complex of the possible configurations, the combination of steerability in a selective drive axle provides the greatest amount of technical challenge. For that reason, among others, it is highly desirable to be able to combine and simplify structures to the fullest extent possible.

There are several devices shown in the prior art disclosing mechanisms for rotationally engaging and disengaging a hub. Many of these devices disclose locking hub clutch systems that have a separate vacuum or pressure chamber located at the outer end of the wheel hub. The problem with these devices is that they must be attached or integrated into areas where there is little room. This may result in many other problems, such as unsightly protrusions extending from the center of the wheel. One prior art device discloses a hub locking clutch device in which the locking actuator piston operates in a machined cylinder within the axle stub shaft and the axle joint yoke. In this device the cylinder and the locking actuator piston are an integral part of the axle shaft. While this device does not require attachment of a separate vacuum or pressure chamber, like the wheel end devices, the space available in the axle provides a relatively small diameter available for transmitting torque between its elements, resulting in higher stresses on its members.

In yet another device, the hub locking actuator is a hydraulically actuated ring and diaphragm which is attached to the knuckle. While this device has a much larger diameter available for transferring torque than the previous devices, it still requires the addition of a separate pressure chamber.

It is therefore an advantage of the present invention to provide a simplified version of a hub locking actuator device which is formed as an integral part of the knuckle.

SUMMARY OF THE INVENTION

This advantage of the present invention is achieved by an integrated wheel end assembly for a vehicle comprising a knuckle coupled to the vehicle and integrally housing a hub lock actuator assembly, a bearing assembly mounted to the knuckle, a cylindrical wheel hub mounted on the bearing assembly, a stub shaft, and a clutch member, wherein the hub lock actuator assembly moves the clutch member selectively between a first non-driving position and a second driving position. The assembly receives drive torque from a half shaft through a constant velocity joint. The bearing assembly allows for relatively free rotation of the wheel hub about a central axis thereof. The wheel hub has a flange for mounting the wheel at an outboard end thereof and a drive flange at an inboard end thereof. An outer circumference of the drive flange has a plurality of external teeth spaced evenly therearound. An outboard end of the stub shaft is rotatingly supported in the wheel hub and an inboard end thereof defines a housing for the CV joint. This housing has a plurality of external teeth identical in size and number to the teeth on the drive flange and the housing and flange are positioned axially adjacent to each other. The clutch member has internal teeth sized and adapted for engaging the external teeth on the housing and the drive flange and is slidable axially between a first position in which the clutch member teeth engage only the CV housing teeth and no drive torque is transferred from the half shaft to the wheel hub and a second position in which the clutch teeth engage both the CV housing teeth and the drive flange teeth and drive torque is transferred from the half shaft to the wheel hub through the engagement.

BRIEF DESCRIPTION OF THE DRAWINGS

A better understanding of the present invention will be had when reference is made to the accompanying drawings, wherein identical parts are identified by identical reference numerals and wherein.

DETAILED DESCRIPTION OF THE PREFERRED EMBODIMENT

Figure 1:
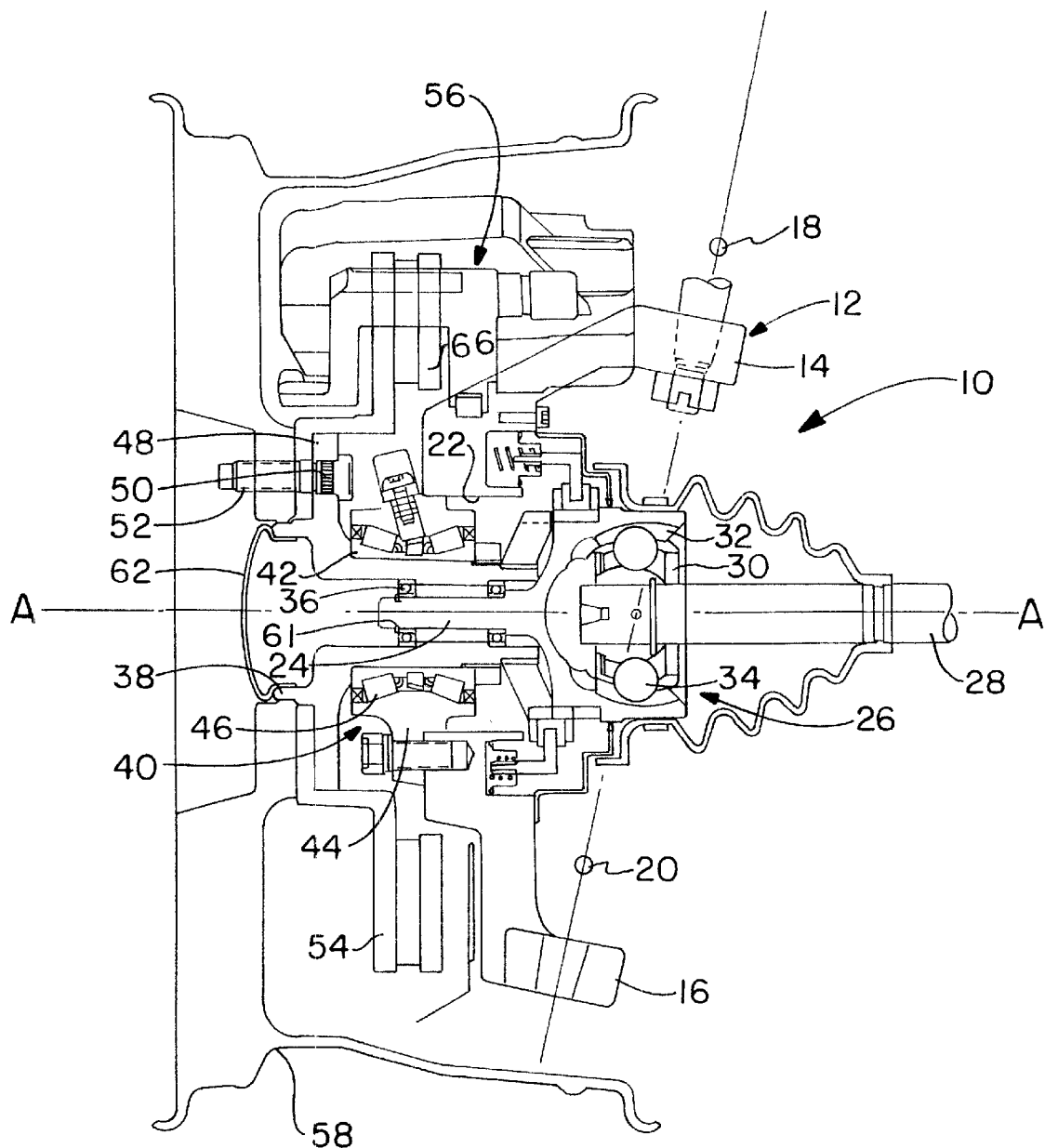
FIG. 1 shows side view cut section view of the axle end assembly.
Figure 2:
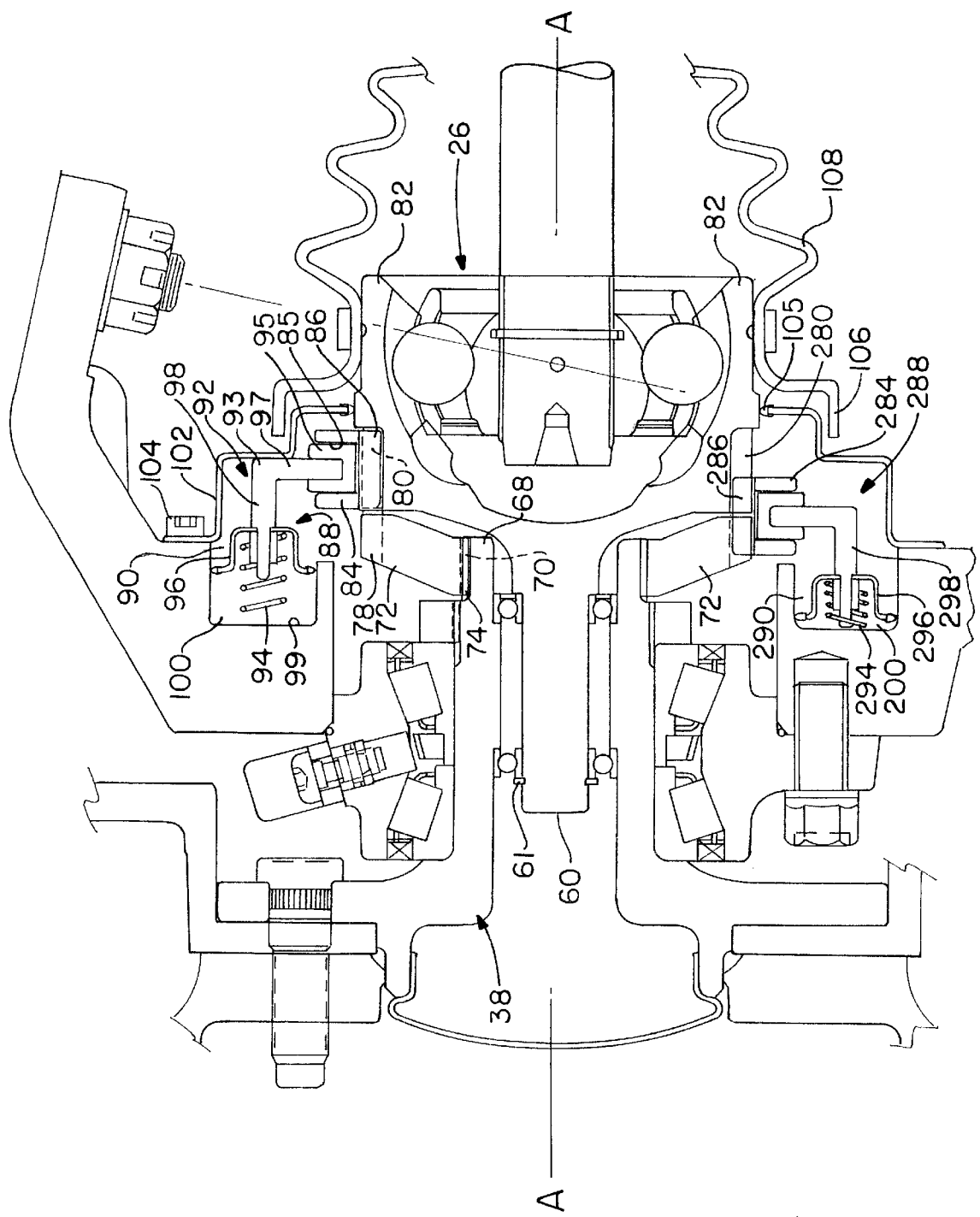
FIG. 2 shows a close up of the same view showing the detail of the integral knuckle and hub lock assembly.

An axle end assembly 10 incorporating the present invention is shown in side sectional views in FIGS. 1 and 2, with FIG. 2 enlarged to emphasize the inventive features of the present invention. There is a general axis of symmetry provided by a centerline A of the assembly. Many of the structures shown above the centerline A will be reflected in a mirror-image fashion below the centerline. However, one important difference is in the hub lock feature. The depiction above the centerline shows the hub lock in the "disengaged" position, that is, the 4×2 or freewheeling position. The lower half of FIG. 1 shows the hub lock in the "engaged" or 4×4 position. An advantage of depicting these structures differently above and below the centerline A is the ability to readily make comparisons of equivalent structures. For reference purposes, parts which are shown in these possibly differing conditions are identified with reference numerals which differ from each other by 200. In other words, a part identified with reference numeral "XX" in the disengaged condition will be identified as "2XX" when shown in the engaged condition.

The assembly 10 has a variety of depicted elements which are generally known and understood and which provide benchmarks for identifying the specific area of the vehicle where the invention will be found. In the axle end assembly 10, the steering knuckle 12 is shown with an upper and a lower mounting boss 14, 16, respectively. These provide pivotal attachment for the knuckle 12 to the frame (not shown) of the vehicle, via upper and lower ball joints (not shown), which would be centered on points indicated as 18, 20, respectively, if they were fully depicted. Although somewhat difficult to discern with all of the other details being shown, the knuckle 12 also includes a central bore 22, with its axis indicated by centerline A. Internal to this bore is a stub shaft 24 of a constant velocity (CV) joint, shown generally as 26. In FIGS. 1 and 2, the right side of the figure is the "inboard" side of the assembly and the left side is the "outboard" side. Drive torque to power this axle end assembly 10 originates at an inboard end of the half shaft 28, which is driven by a torque source (not shown), typically a differential. The outboard end of the half shaft 28 terminates in a linkage with the inboard end of the stub shaft 24 inside the CV joint 26. The half shaft 28 terminates in an inner race 30 with the stub shaft 24 terminating in an outer race 32, the inner and outer races 30, 32. being linked in the specific embodiment shown by a plurality of balls 34. The portion of the stub shaft 24 received inside a wheel hub 38 is supported therein on one or more bearings 36. An annular bearing assembly 40 is affixed to the outboard side of the knuckle 12 and supports the wheel hub in the bore 22. This bearing assembly 40 has an inner race 42 which is journaled onto the axial length of wheel hub 38 toward the inboard end of the hub and an outer race 44. Between the inner and outer races 42, 44, a plurality of roller means, such as taper rollers 46, allow rotation of the inner race inside the outer race.

A radially extending flange 48 on the outboard side of the wheel hub 38 has a plurality of bores 50 equally spaced around the flange. These bores 50 receive stud bolts 52 which face axially outboard. The stud bolts 52 may be used (with lugnuts which are not shown) to mount a brake rotor 54 to the wheel hub 38. This brake rotor 54 interacts with a caliper type brake assembly 56 which is non-rotatably attached to the knuckle 12. This brake assembly allows brake pads (not shown) to be compressed against an outer flange portion 66 of the brake rotor 54 to provide braking to the wheel end assembly 10. Outboard from the brake rotor 54, the same stud bolts 52 are used to mount a wheel rim 58 to the wheel hub 38. The mounting of a tire (not shown) on the wheel rim 58 is well known and is not illustrated. An outer portion of the wheel rim 58 provides a seat for mounting a tire (not shown).

The outboard end 60 of the stub shaft 24 will typically be adapted to receive a device for locking the wheel hub 38 onto the stub shaft 24. In FIG. 1, a snap ring 61 is shown as the locking device. Outboard end may also be provided with a transverse bore (not shown) for receiving a cotter pin (not shown) or the like. A cap 62 is often provided to cover the outboard end of the wheel hub 38 and to protect the bore in the wheel hub and its internal contents.

Turning now to elements of the specific invention, and particularly as it is shown in an enlarged view in FIG. 2, the inboard end 68 of the wheel hub 38 has external splines 70 formed in the outer circumference thereof. A demountable flange 72 has a set of mating internal splines 74 formed on the inner bore thereof. Flange 72 co-rotates with wheel hub 38, and is selectively able to transmit driving torque from the half shaft 28 to the wheel hub, as will be described below. Flange 72 also has an outer circumference with a plurality of external teeth 78 spaced evenly therearound. A corresponding plurality of external teeth 80 are positioned on the outboard side of the CV housing 82 of the CV joint 26, axially adjacent to teeth 78. A rotatable annular shift collar 84, also referred to as a clutch member, has a circumferential groove 85 formed therearound and a plurality of internal teeth 86 cut into its inner bore. These internal teeth 86 are sized and positioned to mesh with teeth 80 on housing 82 as well as the teeth 78 on flange 72. As may be seen by referring sequentially to the upper and lower halves of FIG. 2, shift collar 84 is slidable relative to axis A. In the top portion of the figure, the shift collar 84 is shown in a first, non-driving position with ring gear teeth 86 engaged only with teeth 80. Teeth 78 on flange 72 receive no drive torque through shift collar 84 in this position. Referring now to the bottom portion of the figure, an axial shift of the shift collar 284 in the outboard direction to a second, driving position, allows teeth 286 thereon to concurrently engage the teeth 280 on the housing 282 of the CV joint 26 and the teeth 78 on the outer circumference of the flange 72. This produces a driving connection between the half shaft 28 and the wheel hub 38 to drive the wheel 58. Shift collar 84 effectively provides a clutch to selectively switch the wheel from a driven to a non-driven condition and vice versa.

A hub lock actuator assembly, shown generally as 88, produces the axial shifting of shift collar 84. The assembly 88 is integrated into the knuckle 12. It comprises, in a preferred embodiment, an annular groove 90 machined into an inboard face of the knuckle 12, centered about axis A. Co-acting with groove 90 is a shift collar actuator a clutch member actuator, shown generally as 92. This shift collar actuator 92 comprises at least-one shift fork 93, at least one biaser 94, a bushing 95, and an annular piston 96. In the preferred embodiment, the shift fork 93 comprises a semi-circular portion of a complete annular ring having a radially extending portion 97 and an axially extending portion 98, the axially extending portion being located at the outer circumference of the radial portion. At the inner circumference of the radial portion 97, the bushing 95 is fitted. This bushing 95 is interposed between the shift collar 84 and the shift fork 93 when the shift fork and bushing are inserted into the circumferential groove 85 on the shift collar. When the at least one shift fork 93 and the bushing 95 is in place in circumferential groove 85, the bushing will form at least a semi-circular portion of an annular ring within which shift collar 84 may rotate through its interconnection with CV joint housing 82. The at least one shift fork 93 will not co-rotate with shift collar 84. At least one biaser 94 is seated around the circumference of axial portion 98 of each shift fork 93. One end of the biaser 94, shown in the drawings as a helical spring, bears against a bottom surface 99 of the annular groove 90 and the other end bears against the shift fork 93 by bearing against axial portion 98. The piston 96 is fitted around the axial portions 98 of the shift forks 93, so that the piston sealingly bears against the inner and outer side surfaces of the annular groove 90, defining a vacuum pocket 100. A vacuum source (not shown) available in the vehicle is communicated by conventional means (also not shown) to this vacuum pocket, preferably through the surface 99 or one of the side surfaces of annular groove 90. This vacuum source is controlled ultimately by the vehicle operator as a means for operating the hub lock actuator assembly 88.

The operation of the hub lock actuator assembly 88 is now discussed. Referring first to the upper portion of FIG. 2, the non-driving position of the wheel assembly is shown. In this position, the pressure in vacuum pocket 100 is sufficiently close to the ambient pressure outside of the vacuum pocket so that biaser 94 acts against the axial portion 98 of the shift fork 93 to push the shift collar 84 axially inboard, so that no driven rotation of the demountable flange 72, and consequently, wheel hub 38, results from drive torque coming to CV joint housing 82 through half shaft 28. When a vacuum in drawn in vacuum pocket 100 through actuation of the vacuum source, the result is shown in the lower portion of FIG. 2. In the driving position shown in the lower portion, the pressure in the vacuum pocket 200 has been reduced sufficiently relative to the ambient that the force provided by biaser 294 urging axial portion 298 away from bottom surface 99 is effectively overcome to the point that the piston 296 has been pulled into the annular groove, greatly reducing the volume of the vacuum pocket 200. In that position, the axial portion 298 will bottom out against the bottom surface 99, providing a stop for the axial mobility of shift fork 293. At this stop, shift fork 293 will have moved outboard sufficiently to cause shift collar 284 and its teeth 286 to engage the teeth 78 of flange 72. This transmits drive torque from CV joint housing 82 directly through to the wheel hub 38, resulting in driven corotation of the wheel hub with half shaft 28. While in some embodiments a pair of shift forks 93 will be used to provide full circumferential coverage of the shift collar 86, it is to be understood that use of only a single shift fork 93 will be sufficient in many cases, although it is important that the piston 96 be annular and fit into the annular groove 90 around the entire circumference thereof.

A further feature of the present invention is a slinger component 102 which is attached to the knuckle 12 by a plurality of bolts 104 circumferentially about the knuckle, radially outwardly from the annular groove 90. The slinger component 102 extends axially inboard and radially inward in a series of steps as shown, so that it completely encloses the hub lock actuator assembly 88. At a first end, the slinger component 102 is held directly against the inboard face of the knuckle, and at the second end, the end 105 rests directly against the outer circumference of the CV housing 82, axially inboard from the teeth thereon. It will, of course, be understood that the CV housing will rotate free of any interference from end 105. These two ends of the slinger component effectively seal the hub lock actuator 88, protecting the actuator from dirt, water, or other contaminants. A radial face of slinger component 102 also serves as a stop to limit the stroke of the shift fork 93. The radial extending portions 97 of the at least one shift fork 93 will contact this radial face of the slinger component 102 when the piston 96 is at its fully extended position. This prevents the piston 96 from becoming dislodged from the annular groove 90, preserving the vacuum pocket 100 formed therein, as well as limiting the axial movement of the shift collar 84.

The present invention also comprises an extension 106 of the standard CV boot 108. This extension 106 extends past where it is connected to the housing of the CV joint 26 to project radially outward and further extends axially outboard of the boot around the end 105 of the slinger component 102. The extension 106 acts in a manner to further protect the seal formed with the housing 82. It enhances the ability of slinger component 102 to protect the hub lock actuator assembly 88 and other drive components situated therein from dirt, water, or other contaminants.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. An integrated wheel end assembly for a vehicle adapted to provide driving engagement/disengagement of a wheel (58) to convert between driven and non-driven modes of wheel movement, the wheel end assembly receiving drive torque from a half shaft (28) through a constant velocity ("CV") joint (26), said assembly comprising:

a knuckle (12) coupled to the vehicle, said knuckle having a hub lock actuator assembly chamber (90) integrally formed therein;

a bearing assembly (40) mounted to the knuckle;

a cylindrical wheel hub (38) mounted on the bearing assembly for relatively free rotation about a central axis of the hub, said wheel hub having a flange (48) for mounting the wheel at an outboard end thereof and a drive flange (72) at an inboard end thereof, an outer circumference of the drive flange having a plurality of drive flange teeth (78) spaced evenly therearound;

a stub shaft (24), an outboard end thereof rotatingly supported in the wheel hub (38) and an inboard end thereof defining a CV housing (82) for the CV joint, the CV housing having a plurality of CV housing teeth (80), the CV housing and flange being positioned axially adjacent to each other;

a clutch member (84) having clutch member teeth (86) sized and adapted for engaging the CV housing teeth and the drive flange teeth, the clutch member being slidable axially between a first position in which the clutch member teeth engage only the CV housing teeth and no drive torque is transferred from the half shaft to the wheel hub and a second position in which the clutch member teeth engage both the CV housing teeth and the drive flange teeth and drive torque is transferred from the half shaft to the wheel hub through the engagement, the clutch member being a shift collar (84) having an external circumferential groove; and a hub lock actuator assembly (88) positioned within the hub lock actuator assembly chamber, the hub lock actuator assembly moving the clutch member selectively between the first and second position, the hub lock actuator assembly comprising: an annular groove (90) formed on an inboard face of the knuckle, the groove having a bottom surface (99) and inner and outer side surfaces; and a clutch member actuator (92) communicated to the clutch member, the clutch member actuator having an annular sealing ring (96) affixed thereto, the sealing ring sealingly seated in the annular groove to define a vacuum pocket (100), such that pressure changes in the vacuum pocket cause expansion or contraction of the pocket, resulting in axial movement of the clutch member actuator to selectively shift the clutch member between the respective positions, the communication of the clutch member actuator to the shift collar being achieved through an end (97) of the clutch member actuator being seated in the circumferential groove of the shift collar, with a bushing assembly (95) interposed between the end of the clutch member actuator and the shift collar groove to allow rotation of the shift collar, the clutch member actuator comprising a pair of shift forks (93), each of the shift forks having a radial portion (97), an end of which being the clutch member actuator end seated in the shift collar circumferential groove and an axial portion (98) which extends into the knuckle annular groove and has the sealing ring affixed thereto, an outboard end of the axial portion of each of the pair of shift forks extending into the vacuum pocket and acting as a stop for outboard axial movement of the shift collar by contacting the bottom surface of the knuckle annular groove.

2. The assembly of claim 1, wherein the bushing assembly comprises at least two annular bushing portions.

3. The assembly of claim 1, wherein the clutch member actuator further comprises at least one biaser (94) interposed between the bottom surface of the knuckle annular groove and the axial portion of each of the pair of shift forks.

4. The assembly of claim 3 wherein the at least one biaser is positioned inside the vacuum pocket.

5. The assembly of claim 4, wherein the biaser is a helical compression spring.

6. The assembly of claim 1, wherein the annular grove is adapted to communicate to a vacuum source in the vehicle to selectively effect pressure changes in the vacuum pocket.

7. The assembly of claim 1, wherein the assembly further comprises an enclosure (102) for the hub lock actuator assembly, a first end of the enclosure attached to the knuckle radially outwardly from the knuckle annular groove and a second end thereof sealingly fitted against the CV housing inboard of the CV housing teeth.

8. The assembly of claim 7, wherein the CV joint is enclosed by a CV joint boot.

9. The assembly of claim 8 wherein an outboard extension of the CV joint boot extends radially outwardly and axially around the second end of the enclosure.

10. The assembly of claim 1, wherein the inboard end of the wheel hub is provided with external splines (70) and the drive flange is provided with corresponding internal splines (74) so that the drive flange is removably engaged on the wheel hub.

11. An integrated wheel end assembly for a vehicle adapted to provide driving engagement/disengagement of a wheel (58) to convert between driven and non-driven modes of wheel movement, the wheel end assembly receiving drive torque from a half shaft (28) through a constant velocity ("CV") joint (26), said assembly comprising:

a knuckle (12) coupled to the vehicle, said knuckle having a hub lock actuator assembly chamber (90) integrally formed therein;

a bearing assembly (40) mounted to the knuckle;

a cylindrical wheel hub (38) mounted on the bearing assembly for relatively free rotation about a central axis of the hub, said wheel hub having a flange (48) for mounting the wheel at an outboard end thereof and a drive flange (72) at an inboard end thereof, an outer circumference of the drive flange having a plurality of drive flange teeth (78) spaced evenly therearound;

a stub shaft (24), an outboard end thereof rotatingly supported in the wheel hub (38) and an inboard end thereof defining a CV housing (82) for the CV joint, the CV housing having a plurality of CV housing teeth (80), the CV housing and flange being positioned axially adjacent to each other;

a clutch member (84) having clutch member teeth (86) sized and adapted for engaging the CV housing teeth and the drive flange teeth, the clutch member being slidable axially between a first position in which the clutch member teeth engage only the CV housing teeth and no drive torque is transferred from the half shaft to the wheel hub and a second position in which the clutch member teeth engage both the CV housing teeth and the drive flange teeth and drive torque is transferred from the half shaft to the wheel hub through the engagement, the clutch member being a shift collar (84) having an external circumferential groove;

a hub lock actuator assembly (88) positioned within the hub lock actuator assembly chamber, the hub lock actuator assembly moving the clutch member selectively between the first and second position, the hub lock actuator assembly comprising: an annular groove (90) formed on an inboard face of the knuckle, the groove having a bottom surface (99) and inner and outer side surfaces; and a clutch member actuator (92) communicated to the clutch member, the clutch member actuator having an annular sealing ring (96) affixed thereto, the sealing ring sealingly seated in the annular groove to define a vacuum pocket (100), such that pressure changes in the vacuum pocket cause expansion or contraction of the pocket, resulting in axial movement of the clutch member actuator to selectively shift the clutch member between the respective positions, the communication of the clutch member actuator to the shift collar being achieved through an end (97) of the clutch member actuator being seated in the circumferential groove of the shift collar, with a bushing assembly (95) interposed between the end of the clutch member actuator and the shift collar groove to allow rotation of the shift collar, the clutch member actuator comprising a pair of shift forks (93), each of the shift forks having a radial portion (97), an end of which being the clutch member actuator end seated in the shift collar circumferential groove and an axial portion (98) which extends into the knuckle annular groove and has the sealing ring affixed thereto; and an enclosure (102) for the hub lock actuator assembly, a first end of the enclosure attached to the knuckle radially outwardly from the knuckle annular groove and a second end thereof sealingly fitted against the CV housing inboard of the CV housing teeth, an inner surface of the enclosure acting as a stop for inboard axial movement of the shift collar by contacting the radial portion of the shift fork.

12. The assembly of claim 11, wherein the bushing assembly comprises at least two annular bushing portions.

13. The assembly of claim 11, wherein the clutch member actuator further comprises at least one biaser (94) interposed between the bottom surface of the knuckle annular groove and the axial portion of each of the pair of shift forks.

14. The assembly of claim 13, wherein the at least one biaser is positioned inside the vacuum pocket.

15. The assembly of claim 14, wherein the biaser is a helical compression spring.

16. The assembly of claim 11, wherein the CV joint is enclosed by a CV joint boot (108).

17. The assembly of claim 16, wherein an outboard extension of the CV joint boot extends radially outwardly and axially around the second end of the enclosure.

18. The assembly of claim 11, wherein the inboard end of the wheel hub is provided with external splines (70) and the drive flange is provided with corresponding internal splines (74) so that the drive flange is removably engaged on the wheel hub.

* * * * *